United States Patent
Sipperley et al.

(10) Patent No.: US 11,709,121 B2
(45) Date of Patent: Jul. 25, 2023

(54) MACHINE LEARNING-BASED PARTICLE-LADEN FLOW FIELD CHARACTERIZATION

(71) Applicant: Spraying Systems Co., Wheaton, IL (US)

(72) Inventors: Chad Sipperley, Palm City, FL (US); Rudolf J. Schick, Forest Park, IL (US)

(73) Assignee: Spraying Systems Co., Wheaton, IL (US)

( * ) Notice: Subject to any disclaimer, the term of this patent is extended or adjusted under 35 U.S.C. 154(b) by 224 days.

(21) Appl. No.: 16/950,011

(22) Filed: Nov. 17, 2020

(65) Prior Publication Data

US 2021/0148802 A1 May 20, 2021

Related U.S. Application Data

(60) Provisional application No. 62/936,745, filed on Nov. 18, 2019.

(51) Int. Cl.
*G01N 15/02* (2006.01)
*G06N 3/04* (2023.01)
(Continued)

(52) U.S. Cl.
CPC ..... *G01N 15/0211* (2013.01); *G01N 15/0227* (2013.01); *G06N 3/04* (2013.01); *G06N 3/08* (2013.01); *G06V 10/70* (2022.01)

(58) Field of Classification Search
CPC ....... G01N 15/0227; G01N 2015/0011; G01N 2015/0026; G01N 2015/003;
(Continued)

(56) References Cited

U.S. PATENT DOCUMENTS 6,009,419 A * 12/1999 Coveney ............. G01N 33/383
706/15
10,176,355 B2 * 1/2019 Smith ................. G02F 1/13338
(Continued)

OTHER PUBLICATIONS

European Patent Office, International Search Report and Written Opinion in corresponding International Patent Application No. PCT/US2020/061034 dated Apr. 29, 2021 (15 pages).
(Continued)

*Primary Examiner* — Mohammad K Islam
(74) *Attorney, Agent, or Firm* — Leydig, Voit & Mayer, Ltd.

(57) ABSTRACT

A particle measurement system and method of operation thereof are described. The system and method render a characteristic for a set of particles measured while passing through a measurement volume. The system includes a source that generates a particle-laden field containing the set of particles. The system further includes a sensor that generates a raw particle data corresponding to the set particles passing through the measurement volume of the particle measurement system, where the raw particle data comprises a set of raw particle records and each of one of the raw particle records includes a particle data content. A preconditioning stage carries out a preconditioning operation on the particle data content of the set of raw particle records to render a conditioned input data. A machine learning stage processes the conditioned input data to render an output characteristic parameter value for the set of particles.

16 Claims, 4 Drawing Sheets

(51) Int. Cl.
G06N 3/08 (2023.01)
G06V 10/70 (2022.01)

(58) Field of Classification Search
CPC ... G01N 2015/0046; G01N 2015/0053; G01N 2015/0277; G01N 15/0211; G06N 3/04; G06N 3/08; G06N 20/00; G06V 10/70; G06K 9/62
See application file for complete search history.

(56) References Cited

U.S. PATENT DOCUMENTS

| | | | | |
|---|---|---|---|---|
| 10,458,990 | B1* | 10/2019 | Manautou | G01N 21/6486 |
| 11,003,994 | B2* | 5/2021 | Liang | G06N 3/086 |
| 11,221,289 | B2* | 1/2022 | Jobert | G01N 33/0057 |
| 2004/0162638 | A1* | 8/2004 | Solomon | G05D 1/0088 |
| | | | | 700/247 |
| 2007/0109438 | A1* | 5/2007 | Duparre | G02B 3/0056 |
| | | | | 348/335 |
| 2017/0242234 | A1* | 8/2017 | Ashcroft | G01N 15/1475 |
| 2019/0325270 | A1* | 10/2019 | Gavranovic | G06F 30/20 |
| 2020/0082198 | A1* | 3/2020 | Yao | G06V 10/454 |

OTHER PUBLICATIONS

Anonymous: "Statistical classification—Wikipedia" dated May 28, 2018. Retrieved from URL: https://en.wikipedia.org/w/index.php?title=Statistical_classification&oldid=843354472 (p. 2).

European Patent Office, International Search Report and Written Opinion in corresponding International Application No. PCT/US2020/061034, dated Apr. 29, 2021 (15 pages).

Anonymous, "Statistical Classification Wikipedia", May 28, 2018, XP055724678 (6 pages) Retrieved from the Internet: https://en.wikipedia.org/w/index.php?title=Statistical_classification&oldid=1027955730.

* cited by examiner

Note: Angles and distances not to scale

MACHINE LEARNING-BASED PARTICLE-LADEN FLOW FIELD CHARACTERIZATION

CROSS-REFERENCE TO RELATED APPLICATIONS

This application claims the benefit of U.S. Provisional Application No. 62/936,745, filed Nov. 18, 2019, which is expressly incorporated by reference in its entirety, including any references contained therein.

TECHNOLOGICAL AREA

The present invention relates generally to particle-laden flow characterization apparatuses, and more particularly, to systems for acquiring and characterizing flow fields using a processing stage that incorporates machine learning to render a flow field characterization parameter(s).

BACKGROUND

Spraying applications are categorized by a combination of spray nozzle configuration, sprayed material specification, and external boundary conditions such as fans or walls. The spray nozzle configuration comprises one or more spray nozzles configured in a three-dimensional space—including both distance and direction characteristics. The sprayed material specification comprises one or more sprayed materials (mixed at particular ratios) having particular fluid characteristics—including viscosity, surface tension, volatility, etc.).

Users of such systems have a strong interest in ensuring that a particular spraying application will provide a particular desired coverage—e.g., both complete coverage and even distribution of a particular desired amount. For a given spray application category, it is important to be able to monitor and characterize a spray flow generated by the particular spray applications. Highly complex systems provide such information using high precision measuring devices. Such systems are both extremely expensive and require complex testing procedures that may take days or even weeks to complete. While such known systems are highly desirable, their cost and complexity may preclude their use a vast number of spraying applications that require field configuration—literally in a farm field, in a plant, in a shop, etc.

SUMMARY OF THE DISCLOSURE

On the other hand, the information gained by the above-mentioned complex systems as well as other reliable sources of characterization results may be used to configure and train real-time spray applications.

A system and method are described herein for rendering a characteristic for a set of particles passing through a measurement volume of a particle optical measurement system. Notably, the disclosed system and method address a difficulty in configuring a spray flow field data processor of spray flow field sensor data that renders accurate characterizations of spray flow fields for a wide variety of spray applications.

Embodiments of the present invention provide a particle measurement system and method of operation thereof are described. The system and method render a characteristic for a set of particles measured while passing through a measurement volume. The system includes a source that generates a particle-laden field containing the set of particles. The system further includes a sensor that generates a raw particle data corresponding to the set particles passing through the measurement volume of the particle measurement system, where the raw particle data comprises a set of raw particle records and each of one of the raw particle records includes a particle data content. A preconditioning stage carries out a preconditioning operation on the particle data content of the set of raw particle records to render a conditioned input data. A machine learning stage processes the conditioned input data to render an output characteristic parameter value for the set of particles.

BRIEF DESCRIPTION OF THE DRAWINGS

While the appended claims set forth the features of the present invention with particularity, the invention and its advantages are best understood from the following detailed description taken in conjunction with the accompanying drawings, of which:

Figure 1:
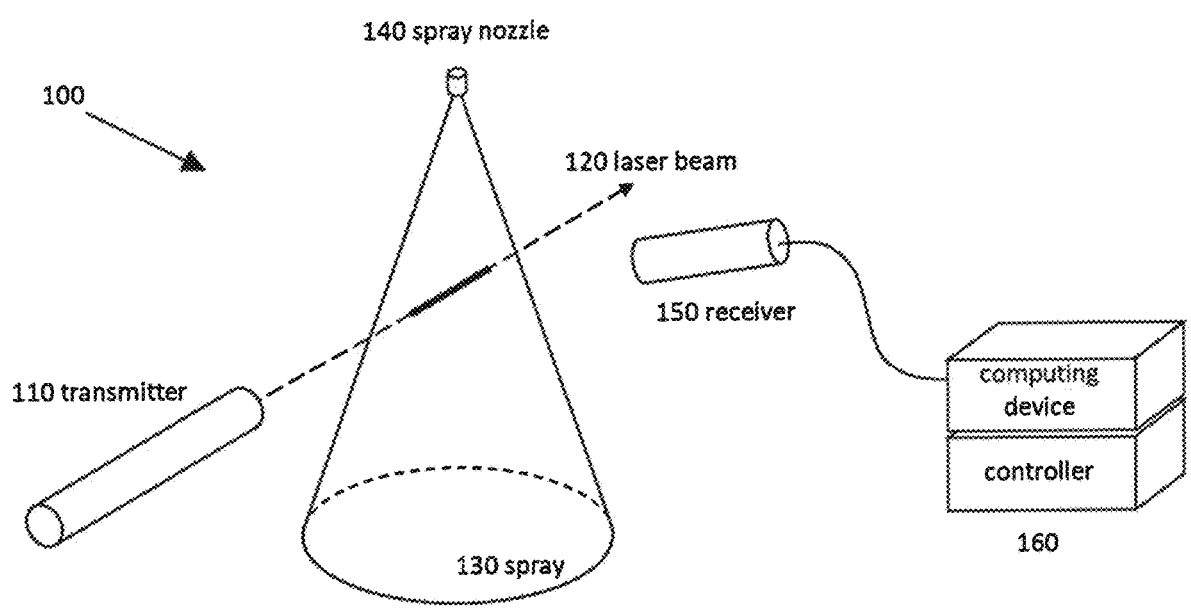
FIG. 1 is a schematic block diagram of an exemplary system arrangement for carrying out an illustrative example of the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION

Illustrative examples are now described that address the need to provide robust and dynamic machine learning-based characterizations of sensed spray flows for particular applications.

Referring to FIG. 1, an illustrative spray distribution imaging system 100 is depicted. The illustrative example of a system carrying out the described invention herein uses off-axis light scattering by droplets to determine the droplet size distribution in a small region of a spray. Referring, in particular, to the example of FIG. 1, an exemplary system is schematically depicted. As will be readily appreciated by those skilled in the art, in this example, a transmitter 110 sends a laser beam 120 through a spray flow field 130 from a spray nozzle 140. A receiver 150—in this particular example, one that is not aligned with the laser beam 120—collects a fraction of light from the laser beam 120 scattered by droplets of the spray flow field 130 in such a fashion that an intensity versus a scattering angle can be recorded for one or more droplets in laser beam 120 path. In the illustrated example system, the receiver 150 is a linear array optical sensor that is effectively a single row of a digital camera. The linear array of sensors making up the receiver 150 record an angular intensity profile of the droplets of the spray flow field passing through the laser beam. The data acquired by the receiver 150 is accumulated and processed, in accordance with a description of illustrative examples, by a computing system and controller 160. The operation of the computing system and controller 160 is described herein below with reference to a particular example summarized in FIG. 2.

Determining a particle size distribution from an angular intensity profile (i.e. the data acquired by the system depicted in FIG. 1) is a well-established technique when used in an on-axis fashion. That is, the receiver is nominally aligned on the same axis as the laser beam. When the particles are small and diffraction dominates the light scattering, the size distribution of the particles can be determined unambiguously. These "ensemble scattering" or "diffraction scattering" instruments are available commercially from multiple vendors and are used to size powders and sprays in many industries.

In the illustrative example, the angular intensity profile of a spray is measured with an off-axis receiver element that restricts the field of view to a small region of the laser beam. Additionally, rather than try to predict a complex scattering pattern, a supervised machine learning system is used to predict measures of a drop size distribution.

Figure 2:
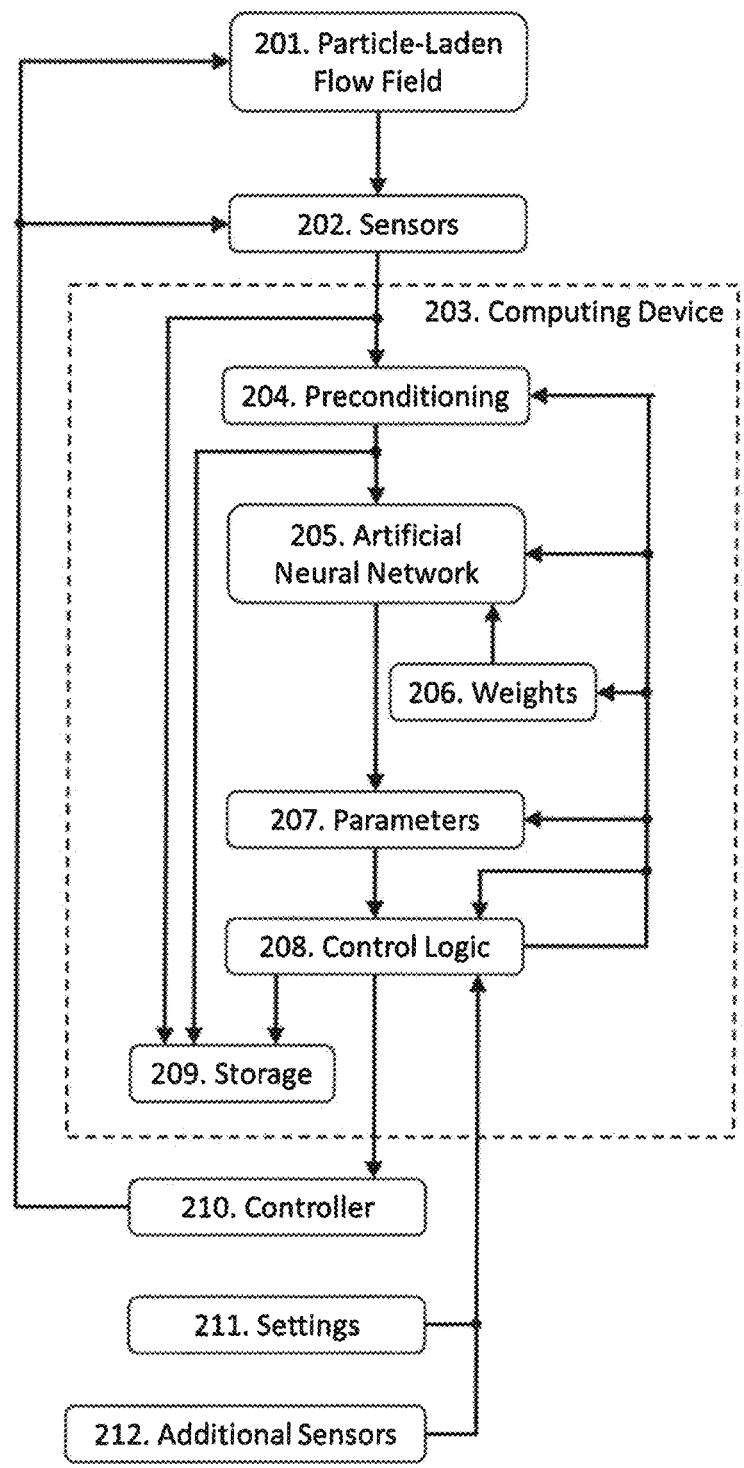
FIG. 2 is a detailed schematic block diagram including further details (sub-components) of the system summarized in FIG. 1, including a flow of data and processing at particular sub-components of the system.

Turning next to FIG. 2, the computing system and controller 160 operates upon data provided by the receiver 150 (e.g. one or more sensors that collect data from the particle-laden spray flow field 130. Importantly, the computing system and controller 160 processes the data originating from the receiver 150 in a machine learning system stage. The output of the machine learning system stage, in addition to providing a current output characterization parameter value (or set of values), is compared to expected (historical results) to reconfigure and/or tune input parameters of the machine learning system stage (e.g. update coefficients of an artificial neural network). Thus, in accordance with illustrative examples, the machine learning system stage of the computing system and controller 160 summarized in FIG. 2, incorporates and utilizes an initial training configuration of the machine learning system stage. Such training includes, for example, configuring the machine learning stage (e.g. setting weights and/or coefficients of neural network nodes and layers) by comparing, for a set of known spray flow field conditions, a generated output of the computing system and controller 160 using a current configuration of the machine learning stage to a known/expected output.

Training sets are generated, for example, by simultaneous acquisition of data from the system described herein and a separately obtained phase-Doppler interferometry data. Phase-Doppler is a standard laboratory technique for measuring droplets one-at-a-time from which a distribution can be approximated.

The initial configuration continues, on an iterative basis, until the configuration renders a set of differences between generated and expected outputs that fall within a specified minimum difference threshold. The specified minimum difference threshold may be specified on an individual difference and/or aggregated total difference (delta) basis on the known output points provided by the training set. Thereafter, the configuration may be updated based upon additional training points or a different set of difference thresholds based upon specific needs and/or experience using the initial/current configuration of the machine learning stage.

As such, the illustrative example is a supervised, dynamically configured (via feedback) machine learning system. More particularly, in the above illustrative example, the computer system and controller 160 the machine learning system stage incorporates a neural network. However, a vast variety of alternative machine learning system stage architectures/types are contemplated, including: support vector machines, linear regression, logistic regression, naive Bayes, linear discriminant analysis, decision trees, k-nearest neighbor algorithm, and similarity learning.

Turning now to the elements of the illustrative example of the computer system and controller 160 aspects of the system depicted in FIG. 2 (in the form of a flow diagram), the physical source of data driving operation of the computer system and controller 160 is a particle-laden flow field 201 that corresponds to the spray flow field 130 generated by the spray nozzle 140 in the illustrative system. The particle-laden flow field 201 is, for example, an environment with one or more dispersed material phases within a fluid (gas, liquid, or plasma). Examples of the particle-laden flow field 201 include sprays or clouds where liquid droplets are dispersed in air, soap bubbles or dust blown into the air, oil droplets or solid particles suspended in water, or air bubbles in water. More than one dispersed phase may exist. For example, in a multiple dispersed phase example, water droplets and solid particles are present in a gas stream. Such multiphase dispersions exist in a spray drying application. The particle-laden flow field 201 may be naturally occurring (clouds, e.g.) or actively generated. In the case of an actively generated flow field 201, one or more controllable input parameters will be present relating to a one or more mechanical requirements of the spray flow field application—such as a pressure for a high-pressure liquid fed to a spray nozzle. The controller element of the computing system and controller 160 may alter the values of the one or more mechanical requirements, in operation, to influence the generated output of the machine learning stage.

The controller element may also provide inputs (e.g., activate/deactivate or specify set operation set points for a one or more sensor systems 202 (e.g. the transmitter 110 and the receiver 150) that may include activation of lights, laser beams, and/or sound waves.

The particle-laden flow field 201, in operation of the system, provides an observable particle field that produces an effect that is observable by the one or more sensor systems 202. The particle-laden flow field 201, in practice, may be a spray volume for any of a variety of sprays through which a laser beam passes.

The one or more sensors 202 transmit data about some aspect of the particle-laden flow field 201. The one or more sensors 202 may respond directly to the particle-laden flow field 201 (such as acoustic sensors affected by pressure waves generated by the flow field 201) or they may be sensors responding to stimulation from an external source (such as an optical camera recording laser light scattered by the particle-laden flow field passing through the laser beam).

The one or more sensors 202 receive stimulation relating to one or more physical properties of the particle-laden flow field 201. The sensors 202 may obtain such stimulation in a non-intrusive manner such as with a microphone or camera, or it may be done in an intrusive manner such as with an impact sensor that relies on physical contact with the particles in the field. The behavior of the sensors may be modified by the controller element of the computing system and controller 160 (e.g., a controller 210 discussed herein below) by changing an amplifier gain on an acoustic sensor or a shutter timing (frequency, duty cycle, etc.) on an optical camera.

The sensors 202 generate one or more signals that can be acquired, stored, and processed by a computing device 203. The signals generated by the sensors carry an information about one or more physical properties of the sensed particle-laden flow field that causes a change to an observable/recordable output of the sensors 202.

In a particular example, the sensors 202 comprise a receiver lens set at 45 degrees off the transmitter axis (135 degrees between the transmitter and the receiver). A variety of optical sensor arrangements are discussed herein below with reference to FIGS. 3A-D, 4 and 5. The sensor elements comprise approximately 1,600 elements in a central region of a 2048-element linear optical sensor. The sensor data is provided to a computer hardware via a hardwired (e.g. USB) connection.

The computing device 203 incorporates multiple identified components that: acquire data from the sensors 202, manipulate the acquired data, store the acquired and manipulated data, and act on results of manipulating the acquired data. The computing device may be a single physical machine or multiple machines operating together to carry out the above-summarized computing activities. Thus, a definition of the boundary of the computing device 203 should be considered a logical partition rather than a physical hardware-defined partition.

The computing device 203 receives a signal output from the sensors 202. The computing device also receives input from a settings 211 input source and a secondary sensors 212. In general, the computing device 203 includes a set of sub-components (described herein below) that process the input from the sensors 202 to render a parameters 207 describing a characteristic of interest of the particle-laden flow field 201 under observation. The parameters 207, in turn, may be used by a control logic 208 to generate a set of control outputs of the computing device 203 (including a control output for specifying an operating parameter of the spray nozzle 140).

Turning to particular sub-components of the computing device 203, a preconditioning component 204 carries out digital data processing on a received raw input of the sensors 202 to render the received output of the sensors in a form that is desired for further processing by the components of the computing device 203. In particular, the preconditioning component 204 renders an acquired data in a form suitable for further processing by a machine learning stage 205 (e.g. a neural network). In its simplest form, such preconditioning may simply be passing the sensor data in digitized form (but otherwise unmodified) to a storage 209 for subsequent use by the machine learning stage 205. Preconditioning may be a simple arithmetic operation applied to each value (multiplying each pixel value by a scalar value) or it could be a complicated algorithm based on multiple sensor data values or even on previously-acquired data. For instance, one may precondition an image by averaging it with several previously-acquired images. Yet another example of precondition is performing a Fourier transform on the sensor data to render received time domain data in the frequency domain. There may be more than one preconditioning steps applied to data from the sensors 202.

With regard to performing a Fourier transform on received data. A Fourier transformation is performed on an intensity profile recorded by a linear set of optical sensors. Multiple sensor records may be summed or averaged before transformation.

By way of example, the preconditioning component 204 receives data directly from the sensors 202. Alternatively, the preconditioning component retrieves the sensor data previously stored in the storage 209.

The preconditioning component 204 reshapes/transforms the received (raw) input data from the sensors 202 into a form that can be processed by the machine learning stage 205 (e.g. neural network). By way of a specific example, the sensors 202 may be a camera having six million pixels but the neural network of the machine learning stage 205 is trained on images of one million pixels. In such case, the preconditioning component 204 down-samples the data (or selects a sub-region to meet the 1 million pixel constraint of the neural network.

Additionally/alternatively, the preconditioning component 204 may pre-process a set of historical data sets acquired from the storage 209. For example, such time data is preconditioned to render a frequency content summary of the data rendered by the sensors (e.g. acoustic sensor) and compare the frequency content summary to data acquired during a previous time period of recorded information. Thus, in the illustrative example, the preconditioning component 204 provides an algorithmically-determined modification of data provided by the sensors 202.

The machine learning stage 205, in a particular example, comprises an artificial neural network. The artificial neural network comprises a collection of configurable/tunable processing layers (with each layer including a set of computational nodes). The artificial neural network incorporates/embodies a set of algorithms designed to perform a pattern recognition on a set of input parameter values to render a trained output. By way of example, the artificial neural network comprises a combination of computational elements and data structures organized as: an input layer, multiple internal/hidden layers, and an output layer. The output from the preconditioning component 204 provides at least a portion of an informational content of the input layer. The output layer constitutes a set of values provided in the form of a set of parameters 207 values. The topology of the artificial neural network of the machine learning stage 205 includes a number of internal layers as well as a quantity of computational nodes within each internal layer and inter-layer connectivity between nodes of adjacent layers of the artificial neural network. By way of example, during the training of the system, configuration of the machine learning stage comprises specifying a set of coefficients (weights) for each of the internal layers of the artificial neural network. More particularly, each layer is filled by a weighted combination of the elements in the previous layer. A nonlinear activation function is applied to the resultant value in each node to determine an output value to be passed to the next layer. This selection of this function is part of the definition of the artificial neural network 205. Examples of this function include a binary step function (a threshold), a sigmoid, a hyperbolic tangent, or even a function such as a Gaussian profile that asymptotes to zero at both domain extremes.

Within the layers of the artificial neural network of the machine learning stage 205, each element of the previous layer is combined in a weighted fashion. The output value for each element is then a non-linear operation acting on that combination. As will be readily appreciated by those familiar with artificial neural network topologies, each internal layer comprises a set of nodes, where each node receives a weighted contribution from each node of a previous layer and provides a weighted output (specified on a per-node basis) to each node at a next internal layer of the artificial neural network. A non-linear operation is performed within each node on the received weighted inputs from the previous layer.

An output layer of the artificial neural network constitutes the input to the parameters 207.

The weight values that provide a configuration of the nodes of the neural network of the artificial learning stage 205 are provided by a weights 206. In particular, the values in each layer of the above-described artificial neural network are provided by the weights 206. Each of the individual values of the weights 206 are configured by a training of the machine learning stage 205 in accordance with a set of specified restrictions (e.g. a performance envelope) applied during the training process. In operation, the weights may be fixed or may be modified to change the behavior of a system (e.g. to account for a new training set or performance envelop).

A system that can correctly respond to all possible flow field regimes may be unnecessarily complex. As compared to a system that can only respond to a limited regime, the fully-capable system would need more hidden layers with more nodes, larger training sets, and more training computational resources. As such, there are advantages to only operating within set bounds. Changing the weights in the artificial neural network changes the bounds to which the system is capable of responding.

The weights 206 can be set at the time of manufacture of the system or changed by a control logic 208. The former would produce a fixed-operation device while the latter would allow the response of the device to change as commanded.

The parameters 207 represent a metric of interest of the particle-laden flow field 201 provided by the machine learning system 205. By way of example, the illustrative example includes two types of parameters: a numerical value, and a confidence index. For example, a numerical value might be a spray angle or an average particle size. A confidence index represents how well the observed particle-laden flow field matches a particular set of conditions presented during training. For example, such a confidence index value of zero may correspond to a spray field where there is no indication of a streaky (uneven spray field) performance, and a value of one indicates conclusive evidence of observed streaky performance. Intermediate values represent various levels of confidence between the two extreme observed conditions. There must be at least one parameter of at least one type with no upper limit of any combination of the two types.

After receiving the output of the machine learning layer 205, the parameters 207 component may simply store/register the receive values. Alternatively, the parameters 207 component may perform data conditioning on the received output from the machine learning layer 205 before storing the data in the storage 209 and/or providing the data to the control logic 208. For instance, the machine learning stage 205 may consider five different regions of an image for analysis. However, only an average value of those five may be of interest for the overall system. A system may be trained to determine the maximum particle size in an image but the parameters step may have to convert that from a measurement in terms of pixels to one in terms of millimeters or micrometers.

Thus, the output of the parameters 207 component may take any of a variety of forms. The values specify/indicates a physical description of the observed spray field and/or a prediction of conformance to a desired/trained target conditions (e.g. a particular flow rate, particle size, particle field density, particle field uniformity, etc.).

In a particular example, the parameters 207 component obtains a median volume diameter value and a span factor value. The median volume diameter is a type of average diameter that describes the size droplet for which half the spray's volume would be found in drops above- or below that amount. The span factor is a measure of how wide the drop size distribution is—how much variation there is between the large and small drops.

A control logic 208 component comprises programmed/configured control definitions that specify operations automatically carried out by the system in response to currently observed results reported by the parameters 207 component. Such operation/decision-making may be carried out according to additional input provided by an external settings 210 component and supplemental status information provided by a supplemental sensors 212 (e.g. temperature, humidity, wind speed, etc.). The control logic 208 is thus tasked with applying preconfigured control definitions to existing sensed conditions (based upon the above-mentioned inputs) to render and issue commands/instructions relating to operation of the system. The control logic 208 may also control storage of data by any component of the system to the storage 209.

The control logic 208 receives input from the parameters 207 as the primary input. However, the control logic 208 may also acquire input from the preconditioning 204, the machine learning stage 205 and/or the storage 209. Thus, operation of the control logic is not limited to acting on data solely from the parameters 207 components. Rather, the control logic is configured to acquire and operate upon virtually any source of data in the system depicted in FIG. 2.

The control logic 208, by way of example, is configured to generate a responsive set of instructions and/or commands to various recipients of commands (virtually any component depicted in FIG. 2) in response to, and in accordance with, a configured logic and the measurements acquired by the sensors 202 and processed by the components of the computing device 203. By way of example, the control logic 208 issues commands to external actuators to change an operating pressure of a nozzle to maintain a certain droplet size distribution, or the control logic 208 may simply issue an alarm to an operator console indicating an observation by the machine learning system 205 that the sensed flow field is no longer operating within desired parameters. The control logic 208 may also send data provided by the parameters 207 component to a data logger for traceability or regulatory purposes.

The control logic 208, by way of example, is configured to change a behavior of the computing device 203, including its own operation. This allows the system to change in response to desired operating conditions or in response to the nature of the flow field 201. For instance, the system may detect that the particle size is on the small end of the response range of the training sets used to set the weights 206. The control logic 208, in response may change the weights to new values from a training set with smaller particles. However, the control logic 208 may also change the overall topology (e.g. the artificial neural network layers) of the machine learning stage itself.

By way of example, the control logic 208 determines how many individual records to average from the linear sensor (of the sensors 202), the gain on the sensor, and the number of elements that are to be passed to the input layer of the artificial neural network. When the control logic 208 determines that the spray is composed of small droplets, the entire angular resolution of 2048 elements is not necessary. As such, the control logic 208 specifies combining the values of multiple adjacent cells into a single value. This reduces the number of elements that must be passed into the input layer of the neural network of the machine learning stage 205. Of course, the neural network topology and its weights must have been trained for that number of input elements. The control logic 208 is responsible for choosing an appropriate network and its weights as it operates.

The external settings 211 provide inputs to the control logic 208 that change the operation of the control logic 208 by, for example, requesting a different set point, or commanding the control logic 208 to start performing a designated additional task such as begin sending/storing data to the storage 209.

The additional sensors 212 facilitate enforcing set bounds for commands issued by the control logic 208. For example, for a droplet size is larger than desired, the control logic 208 may ordinarily command a higher pump pressure. However, a sensor on a pump provides an additional sensor input that indicates that higher pressure is not possible.

The control logic 208, in the illustrative example, is configured to issues an output to virtually any one of the components depicted in FIG. 2 including a controller 210 that is operating outside the logical/structural scope of the computing device 203 (e.g. a supplemental controller carrying out regulatory/supervisory control on a part of the system).

The described system includes a storage 209 to store any of a variety of configuration and historical operational information used by the system depicted in FIG. 2. The storage 209 need not be active all the time. Instead, the control logic may respond to the values of the parameters 207 or to external inputs such as the settings 211 and the additional sensors 212. Unless the system is set to record all the time, the control logic 208 will command the storage to begin recording data provided by, for example, the machine learning stage 205 and the weights 206.

By way of example, the storage 209 data is not used directly during operation of, for example, the machine learning stage 205. Rather, the storage 209 operates as a historian element that provides historical information that may be used for retraining purposes—that is, for determining new weights 206 for future operation of the machine learning stage 205.

The controller 210 accepts the control information sent from the control logic 208 and responds with some action. This action could be just about anything including a hardware change that influences the flow field to a modification of the behavior of the sensors 202. The controller 210 may be hardware device (such as a pump motor controller) or it may be partially or entirely software that is run on a same physical machine as the computing device 203 (but operating independently of the components thereof). Thus, the controller 210 may exist on a same computing hardware used to host the computing device 203, but is considered its own logical element that acts outside of the machine-learning-based system of the computing device described herein above. This could include such actions as logging performance data or emailing an operator if the flow field performance were to exceed defined bounds.

The controller 203 receives commands from the control logic. The controller 203 may perform any of a variety of supervisory/regulatory control operations including change the operating conditions for the flow field 201 and the sensors 202, or may perform a software-defined task.

The settings 211 aid specifying a behavior of the control logic 208. This may include user-input, automatic software control, or other external manual or automated requests. As an example, a user may select a certain coating thickness to be applied by a spray. The control logic 208 would need to have the necessary information to convert this into commands for the controller 210.

The addition sensors 212 specify input to the control logic 208 that conditions a behavior of the control logic 208. The example already given is that the control logic 208 should not attempt to request more pump work if a current sensor on the pump indicates that it is already being used at its maximum capacity.

An important aspect of operation of the machine learning stage 205 (e.g., artificial neural network) is a training process. Training comprises determining the weights 206 for a given neural network of the machine learning stage 205. As with the operational case, the parameters are calculated by the machine learning stage 205 for a series of preconditioned data. But in this case, the data must be accompanied by a label—one or more parameters 207 associated with that data. Since the proper weights are not yet known, an initial starting guess is used. The weights are adjusted until the calculated values of the machine learning stage 205 provided to the parameters 207 component are sufficiently close to prescribed (known) values—i.e. the machine learning stage 205 configuration is operating within a prescribed performance envelope.

Retraining is also performed for any of a variety of reasons. Data collected in the storage 209 may be used as labeled data to refine the system. The labels may simply be a determination that the system is operating well or is malfunctioning. This may add a confidence index for the parameter 207 to the existing system or it may just be used to build a training set that better spans the operational space of the flow field. This may be used to continuously improve the ability of the system to respond to the condition of the flow field and/or to identify aberrant conditions.

Having described the system, including a detailed description of data processing architecture incorporating a machine learning stage 205, attention is directed to FIGS. 3A, 3B, 3C and 3D that detect four optical data acquisition configurations with respect to the transmitter 110 and receiver 150 of FIG. 1. Each example provides a cross section through the system depicted in FIG. 1 along a plane containing a path of dispersed light from the point of the laser beam to a linear optical sensor (the receiver 150). In each view, a gray-shaded circle represents a cross section of the spray at a distance from the nozzle. Though the receiver 150 element is only shown at one possible off-axis position, it should be realized that multiple receiver elements in this plane and/or receiver elements in other planes may be used to record the spatial distribution of the scattered intensity.

Figure 3A:
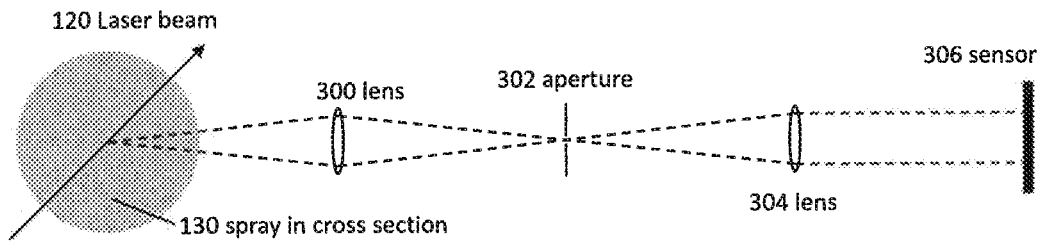
FIGS. 3A-3D provide schematic cross-sectional renderings of optical data acquisition components that are suitable for incorporation into the system depicted in FIG. 1.

In a first optical layout provided in FIG. 3A, a first lens 300 relay-images the laser passing through the spray onto an aperture 302. This blocks all light except for a small amount that passes through the aperture. The measurement volume is then dictated by the size of the laser beam, the width of the aperture, and the magnification of the first lens 300. In all, a characteristic dimension ranging from tens of micrometers to several millimeters is expected. A second lens 304 is placed between the aperture 302 and a sensor 306. This allows one to put the sensor 306 closer to—or at a Fourier plane of the system—i.e. a location where rays that originate parallel to one another at the object (the measurement volume) will end up at the same distance from the optical axis. Operating at the Fourier plane gives the system the highest angular resolution possible for a given set of optics. The first optical layout provides both a highest spatial and angular resolutions. The measurement volume may be made as small as possible and the resolution of the linear array will dictate the angular resolution of the system. However, the physical size of the first optical layout is the largest of the proposed configurations for a given collection angle and sensor. It also has an exposed lens as the first lens 300 element that must remain free from condensation or direct fouling of water droplets from the spray. The receiver (lens 300) must always be placed at the same distance from the spray—the position that creates an in-focus image at the aperture plane. One cannot move the receiver further away from the laser when used in a large spray.

Figure 3B:
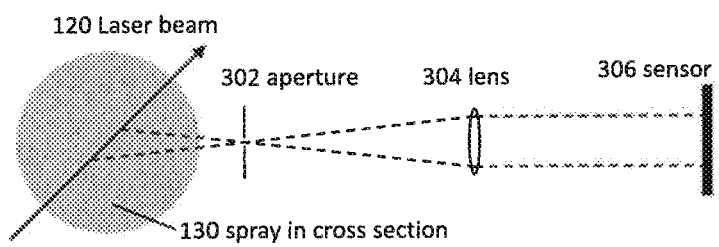

Turning to FIG. 3B, a second optical layout dispenses with the front lens 300 (of FIG. 3A) and places the aperture 302 as the first element in the receiver optical path. Because the sensor 306 is still placed at the Fourier plane of the system the angular resolution of the system is the same as the first. However, the interrogation region is longer than in the first. Each part of the sensor 306 will be sensitive to a different part of the laser beam as it passes through this region. As such, the properties of the spray must not vary substantially over that length. In this example, the aperture 306, operating as a front element, provides a spatial filter that defines the angular response of every portion of the sensor without a need for the lens 300 in front. The second optical layout does not have an exposed lens that must be maintained free from droplets or condensation. The receiving optic can also be placed at a variable distance from the laser beam if there is a strong reason to do so. Making such a distance change does result in a change in the length of the interrogation region over which the measurements are made. The second optical system is shorter than the first for the same angular resolution and sensor size but can potentially be placed much closer to the interrogation region if desired. However, the spatial resolution of this optical configuration is not as good as the first. Additionally, the droplet size distribution cannot deviate substantially over the length of this longer interrogation region or else an invalid measurement may result. However, the second concern can be addressed by using a training set with a very similar variation.

Figure 3C:
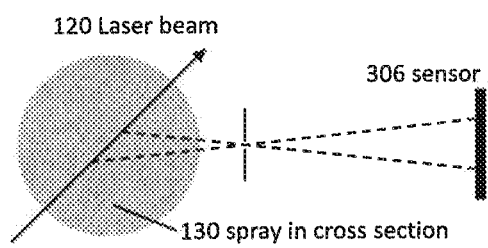
Figure 4:
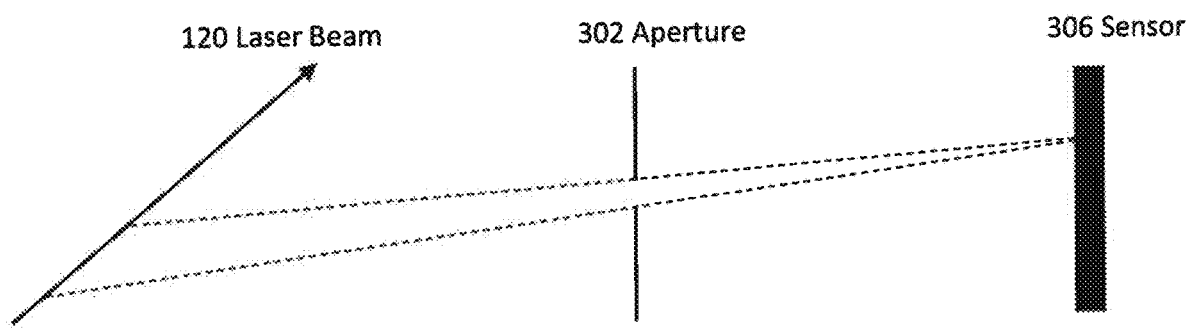
FIG. 4 provides a schematic cross-section view of an optical sensor arrangement according to a particular illustrative example.

Turning to FIG. 3C, a third optical configuration is provided that is similar to the second but does away with the back lens. This removes the opportunity to place the sensor 306 at the Fourier plane of the system. Instead, each location on the sensor 306 is illuminated by a triangle through the aperture 302 to the laser beam as illustrated in FIG. 4. In this case, not all the light to strike any point on the sensor 306 is parallel which means the angular resolution of the system is diminished. For sprays composed of small droplets, the maximal angular resolution may not be necessary. As such, this simplified system may still be sufficiently performant. Additionally, one may consider using a linear sensor, for the sensor 306 with far fewer elements than might be used in the first two configurations. In fact, one may even consider using as little as a few dozen discrete optical sensors rather than an integrated package. The third optical package is more compact than either of the first two. It also has no lenses. As such it should be quite inexpensive to manufacture. Like the second layout, it does not have an exposed lens in the front of the receiver that must remain clean and condensation free. However, the third optical package has all of the cons of the second optical layout with lower angular resolution as well. This will restrict the possible types of sprays for which this system is capable of properly measuring. However, for sprays comprised mostly of small droplets, the system may still be sufficiently performant.

Figure 3D:
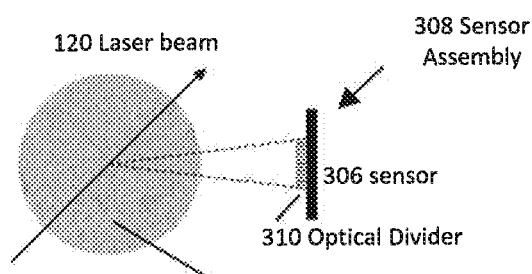
Figure 5:
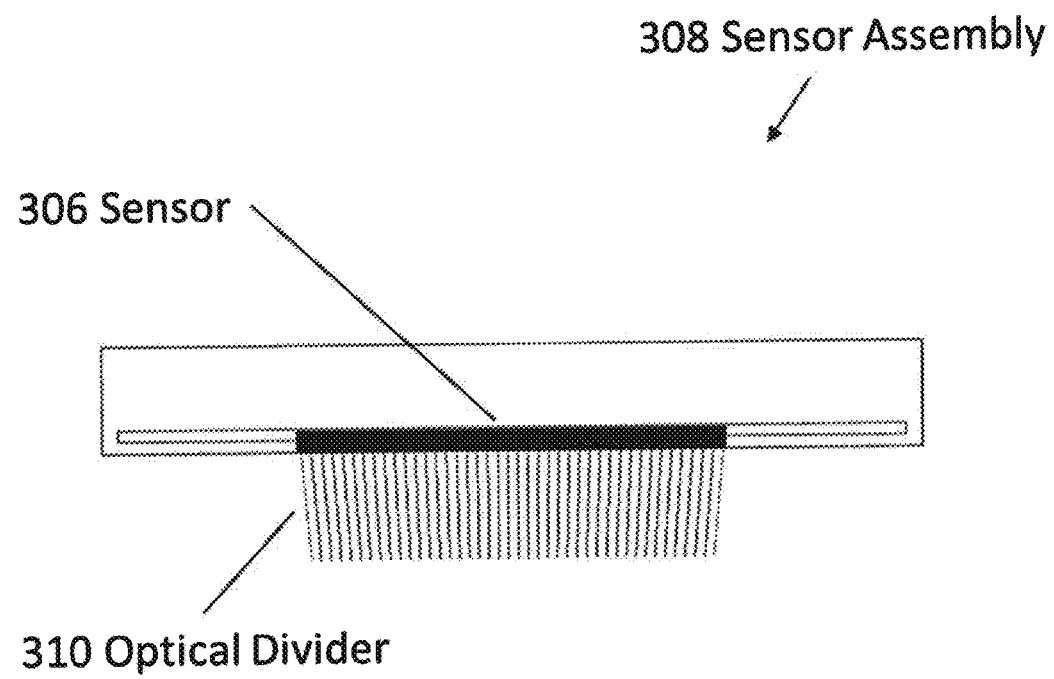
FIG. 5 is a schematic diagram of an optical sensor including a set of physical optical channels according to a particular illustrative example depicted in FIG. 4.

Turning to FIG. 3D, a fourth optical layout is provided that has a completely different receiver geometry than the previous three optical layouts discussed herein above. There is no view-restricting aperture or any lenses. Instead, a sensor assembly 308 comprises the sensor 306 and an optical divider 310 that includes a series of physical channels that restricts the field of view of each region of the sensor 306 as illustrated in FIG. 5. The diagram in FIG. 5 illustrates a few dozen channels leading to the sensor (the black rectangle). This is likely the minimum number of channels that could be used. Ideally hundreds or even over a thousand channels are provided. The aspect ratio of the channels (the length of an opening divided by the width) dictates an angular resolution of such a system. If there a small number of channels it may be possible to laser drill or micro machine the channels. This is especially true if the sensor at the end of each channel is a discrete optical sensor and is not part of an integrated multi-element sensor. For larger numbers and/or smaller channels, the passages could be formed by lithography to selectively acid etch the passages. The same effect could potentially be achieved by having two slit arrays separated by some distance—to match the openings in the diagram. Furthermore, the channelization of optical input can be extended to two dimensions and applied to imaging with a two-dimensional camera sensor. The fourth optical configuration is potentially the most compact of all the options. If the channels are arranged such that they overlap at a single point in space, the fourth configuration may have a similar spatial resolution capability to the first configuration. However, if one is willing to accept a lengthening of the measurement volume as was seen in the second and third configurations, it would be possible to move the receiver closer to- or further from the laser beam as desired. However, the angular resolution of the fourth configuration is not likely to be as high as the first two optical arrangements. Moreover, there would be dead spots in the shadows of the channel walls. Additionally, the fourth optical arrangement requires manufacturing techniques outside what are typically used for spray system instrumentation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out using an optical data acquisition arrangement, for rendering a characteristic for a set of particles measured while passing through a measurement volume of a particle measurement system including a machine learning stage, the method comprising:
    acquiring a raw particle data for the set particles passing through the measurement volume of the particle measurement system, where the raw particle data comprises a set of raw particle records and each of one of the raw particle records includes a particle data content;
    preconditioning the particle data content of the set of raw particle records to render a conditioned input data; and
    processing, by the machine learning stage, the conditioned input data to render an output characteristic parameter value for the set of particles,
    wherein, during the acquiring, the raw particle data is acquired using the optical data acquisition arrangement comprising:
        an optical source comprising a light scattered off particles;
        a sensor; and
        a set of optical components that relay the light from the optical source to the sensor such that there is a functional relationship between a position on the sensor and a scattering angle of light from the optical source,
        wherein the set of optical components comprise at least one component taken from the group consisting of:
            an aperture whose geometric relationship with the rest of the optical components and the sensor sets the functional relationship; and
            a series of channels that only allow light of a specific angle to reach any part of the sensor.

2. The method of claim 1, wherein the machine learning stage comprises an artificial neural network comprising a topology and a set of weights.

3. The method of claim 2, further comprising setting values for ones of the set of weights.

4. The method of claim 3, further comprising changing the topology.

5. The method of claim 1, wherein the processing, by the machine learning stage, further comprises rendering a confidence factor for the output characteristic parameter.

6. The method of claim 1, wherein the processing, by the machine learning stage, further comprises rendering a numeric physical description.

7. The method of claim 1, wherein the particle measurement is an optical measurement.

8. A particle measurement system that renders a characteristic for a set of particles measured while passing through a measurement volume, the system comprising:
    a source that generates a particle-laden field containing the set of particles;
    a sensor that generates a raw particle data corresponding to the set particles passing through the measurement volume of the particle measurement system, where the raw particle data comprises a set of raw particle records and each of one of the raw particle records includes a particle data content;
    a preconditioning stage configured to carry out a preconditioning operation on the particle data content of the set of raw particle records to render a conditioned input data; and
    a machine learning stage configured to process the conditioned input data to render an output characteristic parameter value for the set of particles,
    wherein the raw particle data is generated by using an optical data acquisition arrangement comprising:
        an optical source comprising a light scattered off particles;
        the sensor; and
        a set of optical components that relay the light from the optical source to the sensor such that there is a functional relationship between a position on the sensor and a scattering angle of light from the optical source,
        wherein the set of optical components comprise at least one component taken from the group consisting of:
            an aperture whose geometric relationship with the rest of the optical components and the sensor sets the functional relationship; and
            a series of channels that only allow light of a specific angle to reach any part of the sensor.

9. The system of claim 8 wherein the machine learning stage comprises an artificial neural network comprising a topology and a set of weights.

10. The system of claim 9, wherein the machine learning stage supports setting values for ones of the set of weights.

11. The system of claim 10, wherein the machine learning stage supports changing the topology.

12. The system of claim 8, wherein the machine learning stage is configured to render a confidence factor for the output characteristic parameter.

13. The system of claim 8, wherein the processing, by the machine learning stage, further comprises rendering a numeric physical description.

14. The system of claim 8, wherein the particle measurement is an optical measurement.

15. An optical data acquisition arrangement comprising:
    an optical source comprising a light scattered off particles;
    a sensor; and
    a set of optical components that relay the light from the optical source to the sensor such that there is a functional relationship between a position on the sensor and a scattering angle of light from the optical source,
    wherein the first optical component is an aperture whose geometric relationship with the rest of the optical components and the sensor sets the functional relationship.

16. An optical data acquisition arrangement comprising:

an optical source comprising a light scattered off particles;

a sensor; and a set of optical components that relay the light from the optical source to the sensor such that there is a functional relationship between a position on the sensor and a scattering angle of light from the optical source, wherein the optical components are a series of channels that only allow light of a specific angle to reach any part of the detector.

* * * * *